UNITED STATES PATENT OFFICE.

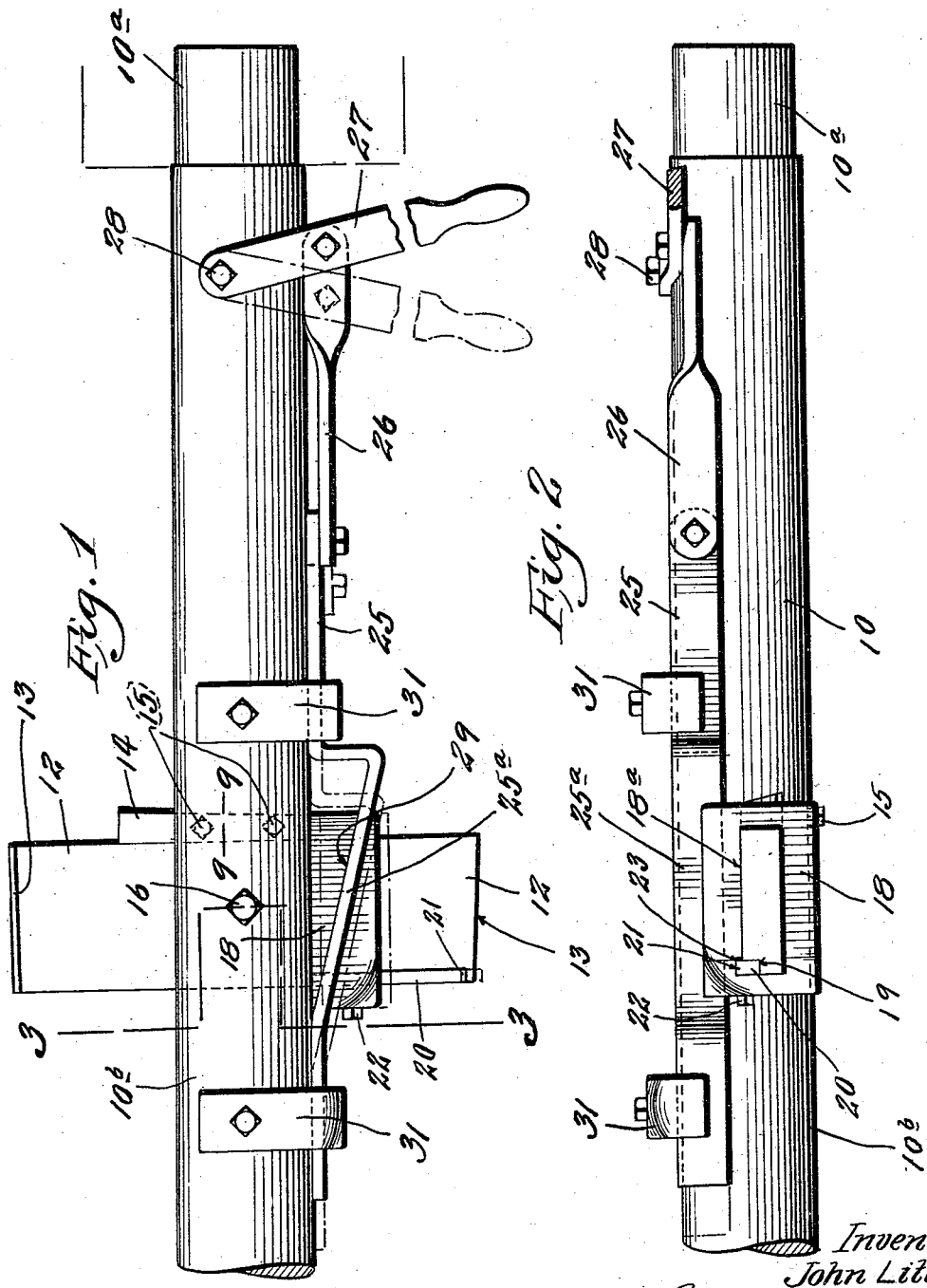

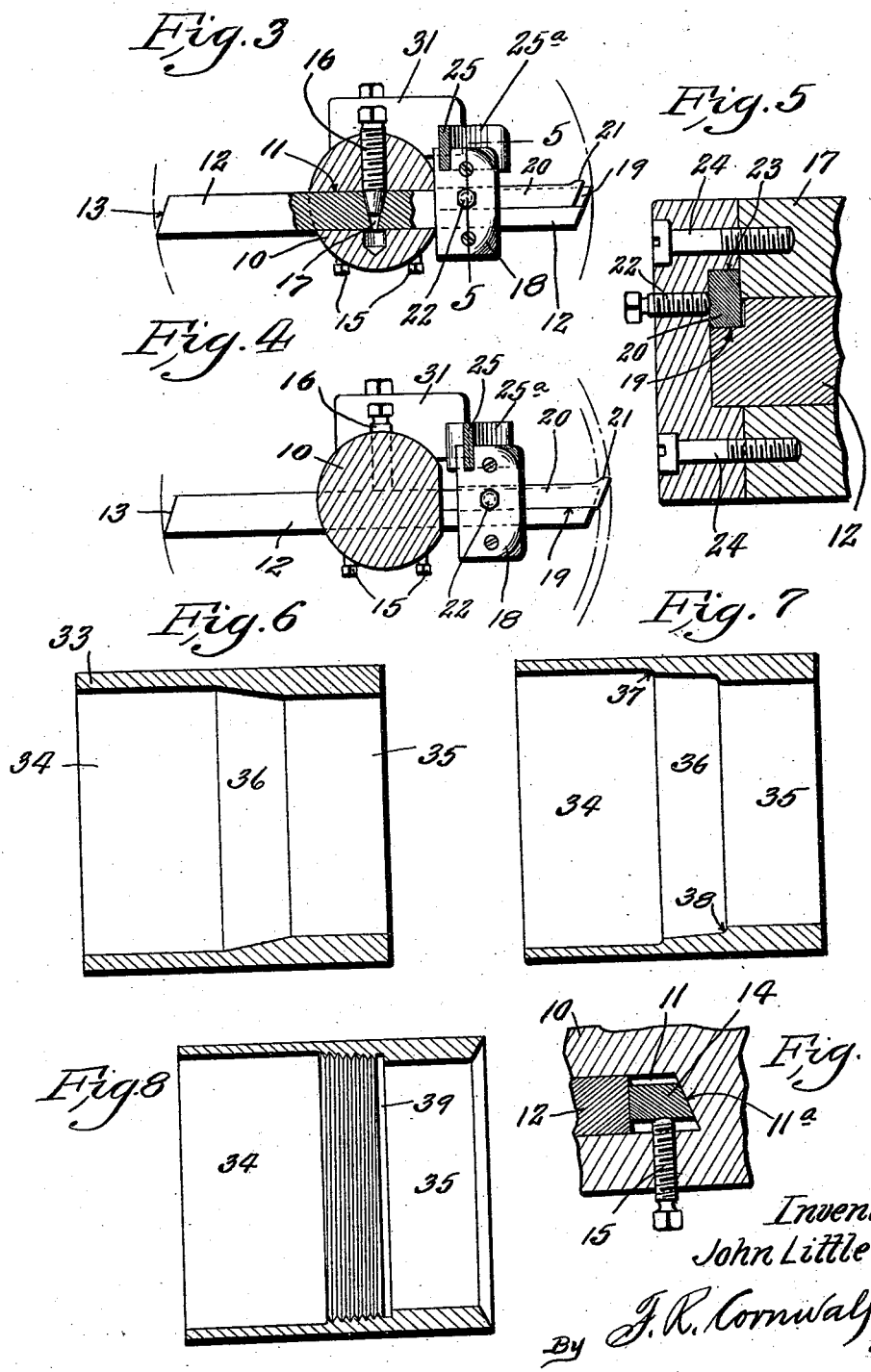

JOHN LITTLE, OF ST. LOUIS, MISSOURI, ASSIGNOR TO JOHN J. LARKIN, OF ST. LOUIS, MISSOURI.

EXPANSIBLE BORING TOOL.

1,415,590. Specification of Letters Patent. Patented May 9, 1922.

Application filed December 31, 1920. Serial No. 434,198.

*To all whom it may concern:*

Be it known that I, JOHN LITTLE, a citizen of the United States, residing at St. Louis, Missouri, have invented a certain new and useful Improvement in Expansible Boring Tools, of which the following is a full, clear, and exact description, such as will enable others skilled in the art to which it appertains to make and use the same, reference being had to the accompanying drawings, forming part of this specification.

This invention relates generally to boring tools for lathes and more particularly to an expansible boring tool which is adapted to be expanded during the boring operations.

The objects of the invention are, to provide an expansible boring tool for lathes which is simple in operation, is of durable construction, and can be manufactured at low cost.

Other objects of the invention are to provide an expansible boring tool which can be easily and quickly adjusted to different cutting positions, and to provide adjustable means whereby said tool will remain in its adjusted position without the aid of any locking or retaining means.

Further objects of the invention are to provide a radially expansible boring tool adapted to be used in combination with fixed boring tools whereby two or more cutting operations can be performed by means of the same lathe bar or tool holder.

With the foregoing and other objects in view, my invention consists in certain novel features of construction and arrangement of parts, hereinafter more fully described and claimed, and illustrated in the accompanying drawings, in which—

Figure 1 is a plan view of the device showing, in dotted lines, the expansible boring tool and the parts associated therewith in expanded position.

Figure 2 is a front elevation.

Figure 3 is a vertical cross section taken on the line 3—3 of Figure 1.

Figure 4 is a similar cross section showing certain parts in moved position.

Figure 5 is a longitudinal cross section taken on the line 5—5 of Figure 3.

Figure 6 is a longitudinal cross section through a drive shoe for casings for oil wells before the boring operations.

Figure 7 is a similar view after certain boring operations have been performed, and ready for the expansible boring tool.

Figure 8 is a similar view of the finished article.

Figure 9 is a detail view on the line 9—9 of Figure 1.

Referring by numerals to the accompanying drawings, 10 designates a lathe bar or tool carrier, one end of which, $10^a$, is arranged to be carried by the turret of a turret lathe or by the tail stock of a lathe. A transverse slot 11 is formed in said bar in the opposite end $10^b$, and fixed in said slot is a boring tool 12, the ends of which extend radially from said bar the desired distance and are provided with cutting faces 13. The slot 11 is wider than the tool 12 and one of its side walls inclines upwardly as at $11^a$.

A wedge 14 having a corresponding inclined wall is inserted in slot 11. Bearing against the underside of the wedge are the upper ends of screws 15 which are threaded in the lower portion of bar 10. By turning screws 15 in the proper direction, their ends are forced against the wedge 14, causing it to move upwardly, and by virtue of the engagement of the inclined walls of said wedge with the inclined side wall $11^a$ of slot 11, said wedge is forced against the side of boring tool 12, thereby securely clamping it in position in slot 11 of bar 10.

The boring tool 12 is locked in position by screw 16 threaded in the upper portion of bar 10 and having its lower end tapered downwardly so as to enter a conical aperture 17 formed in boring tool 12. To one side of lathe bar 10 is disposed a block 18 which is slidably supported on boring tool 12 by means of a slot $18^a$ formed in said block and which slot is occupied by one end of said boring tool 12. The upper corner of one side of said boring tool 12 is cut away to form a step or groove 19 and occupying said groove is an expansible cutting tool 20. The outer end of the cutting tool 20 is provided with a cutting face 21 and its inner end is adapted to be engaged by screw 22 having threaded engagement with slidable block 18.

When screw 22 is screwed to its home position, cutting tool 20 is engaged by said screw and secured to slidable block 18. The upper portion of expansible cutting tool 20 projects above said boring tool 12 and enters a recess 23 formed in block 18 whereby, when screw 22 is screwed home, expansible cutter 20 is clamped between said screw and the shoulder 23 formed on block 18 and any binding or sticking between said expansible cutting tool 20 and the boring tool 12 is avoided.

For the sake of convenience in manufacturing, the block 18 can be made in sections and secured together by any suitable means, such as screws 24. A flat bar 25 is longitudinally disposed on one side of lathe bar 10 and above slidable block 18. The outer end of the longitudinal bar 25 is connected by a link 26 to a horizontal handle 27 which is pivotally connected at 28 to the top of lathe bar 10. Longitudinal bar 25 is provided with an angularly disposed portion 25$^a$ which traverses a diagonal slot 29 formed in the upper face of slidable block 18. Longitudinal bar 25 is guided in its longitudinal movement by guide blocks 31 fixed to the top of lathe bar 10 and having longitudinal slots in their undersides which are traversed by the upper edge of bar 25.

Assuming the boring tool is used in finishing drive shoes for casings for oil wells, one form of which is illustrated in Figures 6, 7, and 8, an unfinished or rough drive shoe 33 such as illustrated in Figure 6 is positioned in the chuck of a lathe and portions 34 and 35 of its interior are finished by a straight boring tool (not shown). The tapered portion 36 is now finished by boring tool 12 having tapered cutting faces 13. These finishing cuts will have round corners 37 and 38, Figure 7, and to remove these round corners and to cut an annular groove 39, (Figure 8) I employ the expansible cutter 20. After the tapered portion 36 has received its finishing cut, handle 27 is slowly moved toward the position shown in dotted lines in Figure 1. This movement of the handle feeds bar 25 forward and causes the angular portion 25$^a$ through its engagement with the diagonal slot 29 in block 18 to move said block outwardly, thereby bringing the cutting face 21 of expansible boring tool 20 outwardly past the cutting face 13 of boring tool 12. This radial movement of the expansible cutter 20 permits the cutting operations to be performed within the interior of the drive shoe and the like in finishing annular shoulders or grooves without the necessity of employing a separate lathe bar. When the annular groove has been cut, the expansible cutting tool 20 is withdrawn inwardly by means of handle 27 and the lathe bar 10 can be removed from said drive shoe. The tapered portion 36 is now threaded, as shown in Figure 8, for a pipe and the annular groove 39 forms a seat against which the end of the pipe can be seated.

By means of my expansible boring tool, the various boring operations necessary in the manufacture of drive shoes and other material can be performed without removing and replacing the various cutting tools after each operation, thereby accomplishing a great saving in the time and labor heretofore expended.

While I have shown and described the expansible boring tool as used in connection in finishing drive shoes for casings for oil wells, it is obvious that my expansible boring tool can be used wherever boring operations are performed.

I claim:

1. In a boring tool, a lathe bar, a radially disposed boring tool fixed to said bar, an expansible cutting tool mounted on said fixed boring tool, and manually controlled means for operating said expansible tool.

2. In a boring tool for lathes, a lathe bar, a radially disposed boring tool fixed in said bar, a cutting tool movably mounted on said boring tool, and a longitudinally movable member having an angularly disposed portion adapted to actuate said expansible tool.

3. In a boring tool for lathes, a lathe bar, a radially disposed boring tool fixed in said bar, a radially movable block carried by said boring tool, a cutting tool fixed to said block, and manually actuated means adapted to move said block radially with respect to the axis of said lathe bar.

4. In a boring tool for lathes, a lathe bar, a radially disposed boring tool fixed to said bar, a slidable block carried by said boring tool, a cutting tool fixed to said block, and a longitudinally movable member supported on said lathe bar and provided with an angularly disposed portion in engagement with said block, whereby the longitudinal movement of said member will impart a radial movement to said block and cutting tool.

5. An expansible boring tool for lathes comprising a lathe bar, a radially disposed boring tool fixed to said bar, a cutting tool supported on said boring tool and adapted to be moved radially relative thereto, and a longitudinal movable member arranged to move said cutting tool.

6. An expansible boring tool for lathes comprising a lathe bar, a radially disposed boring tool fixed to said bar, a block slidably supported on said boring tool, a cutting tool carried by said block, and a longitudinally movable member having a cam portion in engagement with said block, which cam portion is adapted to move said block in radial direction when said longitudinal member is operated.

7. An expansible boring tool for lathes comprising a lathe bar, a block slidably carried thereon and movable in lateral direction, a cutting tool fixed to said block, and a longitudinal member movably supported on the exterior of said lathe bar and having an angularly disposed portion, said block having a diagonal groove traversed by the angular portion of said longitudinal member whereby said block and cutting tool are moved laterally when said longitudinal member is actuated.

8. An expansible boring tool for lathes comprising a lathe bar, a block slidably carried thereon, a cutting tool removably fixed to said block, a longitudinally movable member having a cam portion cooperating with a groove in said block, which cam portion is adapted to impart radial movement to said block, and a handle pivotally mounted in said bar for manually operating said longitudinal member.

9. In a boring tool for lathes, a lathe bar provided with a transverse slot, a boring tool fixed in said slot and provided with cutting faces extending radially from said bar, an expansible cutting tool operating in a recess formed in said boring tool, slidable means arranged to support said expansible cutting tool on said boring tool, and a longitudinally movable member having operative engagement with said slidable means, whereby the cutting face of said cutting tool can be moved radially past the cutting face of said boring tool.

10. In a boring tool for lathes, a lathe bar, a boring tool extending radially from said bar, a slidable block mounted on said boring tool, and a cutting tool fixed to said block adjacent to said boring tool, and movable so that the cutting edge occupies a position beyond the boring edge of the boring tool.

In testimony whereof I hereunto affix my signature this 28th day of December, 1920.

JOHN LITTLE.